Figure 1:
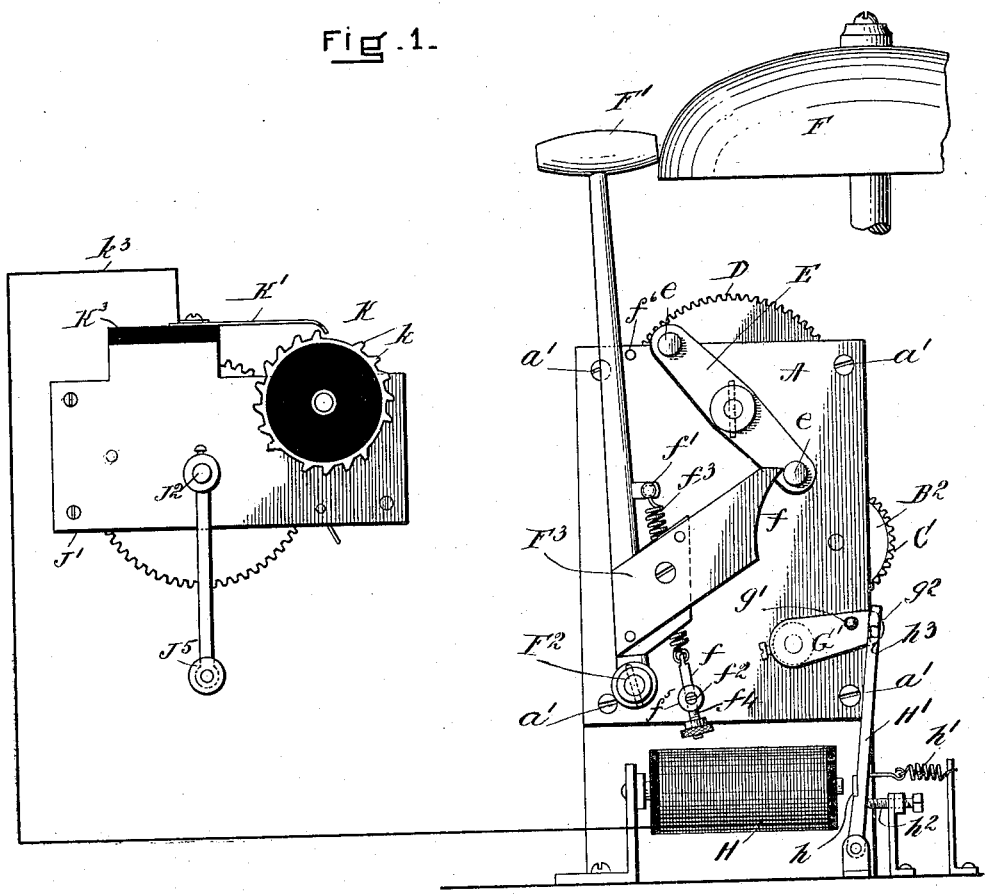

F. WILLIAMS.
BELL SOUNDING MECHANISM.
APPLICATION FILED MAY 10, 1913.

1,190,207.

Patented July 4, 1916.
2 SHEETS—SHEET 1.

WITNESSES:
M. E. Flaherty.
A. E. O'Brien.

INVENTOR
Frederick Williams
By
Cyrus O Hayes
his attorneys.

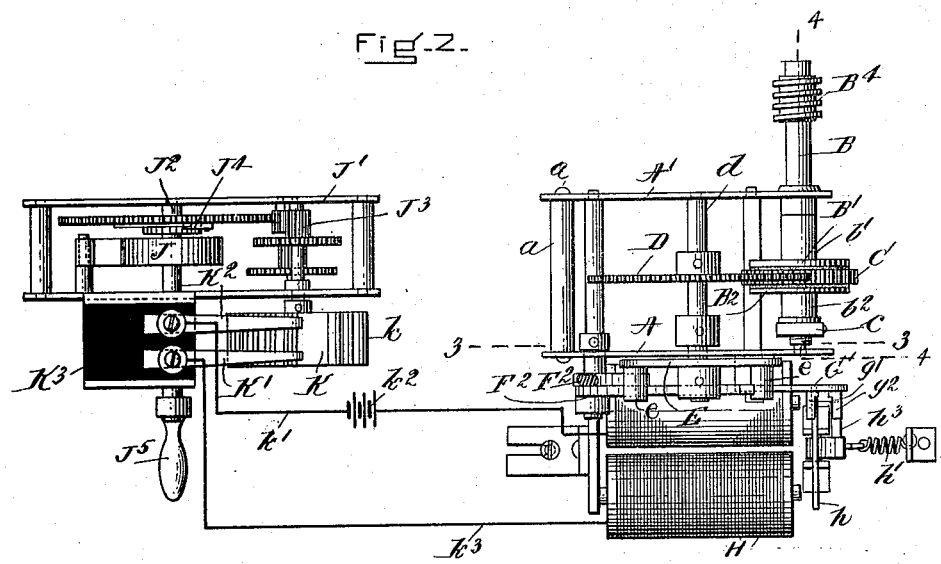

UNITED STATES PATENT OFFICE.

FREDERICK WILLIAMS, OF SOMERVILLE, MASSACHUSETTS, ASSIGNOR TO ACME REGISTER COMPANY, OF SOMERVILLE, MASSACHUSETTS, A CORPORATION OF MASSACHUSETTS.

BELL-SOUNDING MECHANISM.

1,190,207.  Specification of Letters Patent.  Patented July 4, 1916.

Application filed May 10, 1913. Serial No. 766,712.

*To all whom it may concern:*

Be it known that I, FREDERICK WILLIAMS, of Somerville, county of Middlesex, and State of Massachusetts, citizen of the United States, have invented a new and useful Improvement in Bell-Sounding Mechanism.

My invention relates to improved means for sounding a bell electrically, and is especially adapted for use in school houses and yards where now bells are operated by hand to give a signal for the hour when the school is to begin or for other purposes, and is intended especially for use where a numbered signal of some kind is to be given.

It comprises a bell-ringing mechanism which is electrically controlled and preferably also, mechanism whereby the control is made automatic.

My invention will be understood by reference to the drawings in which—

Figure 1 shows the complete mechanism in side elevation. Fig. 2 being a plan, the bell and hammer and one of the parts being removed. Fig. 3 is a section on line 3—3 of Fig. 2, and Fig. 4 is a section on line 4—4 of Fig. 2.

The main feature of the novelty consists in a continuously running clock mechanism which at the appropriate time, by means of electrical impulses, is connected to the mechanism by which the striker is caused to strike the bell. This mechanism as a whole is mounted in a frame comprising two plates A A' attached together by means of posts $a$ and screws. In these plates are mounted a train of gears now to be described. The shaft B is connected to any suitable constant running motor, for example a clock mechanism, whereby it may be given a continuous rotation at such speed as seems desirable, $B^4$ being a worm adapted for such connection. On this shaft B is mounted two friction disks $B^1$, $B^2$, each carried by a sleeve $b'$ $b^2$. The sleeve $b'$ is pinned to the shaft B to turn therewith so that the disk B' rotates with the shaft. The sleeves $b^2$ carrying the disk $B^2$ is loose on the shaft. Between these friction disks is a gear C, and a clamp $c$ is provided by means of which the friction disk $B^2$ and gear C are set in close contact with the disk B' to form with it a friction clutch such that unless the gear C is prevented from moving it will be turned by its contact with the friction disk B'; but if anything tends to hold the gear C from revolution the disk B' will slip by it. The clamp $c$ is shown in Figs. 3 and 4 and comprises a split collar, the ends of which are bound together by means of a screw $c'$. In setting up this clock mechanism I prefer to make the shaft B of two diameters, so that a shoulder $b$ will be formed in the plane of the disk B', against which I place a washer $b^3$, and against this washer place the gear C. On the other side of the gear is a washer $b^4$, and against it comes the friction disk $B^2$. At the other end of the sleeve $b^2$ is a washer $b^5$ against which the clamp $c$ sets, and in practice, in assemblying these parts, the clamp $c$ is so applied to the shaft B as to hold the various parts in close contact. The various washers are of some material such as felt, by means of which a good frictional contact will be secured. In mesh with the gear C is a gear D, and on the shaft $d$ which carries this gear D and outside of the plate A is a yoke E having arms of equal length, each carrying at its extremity a pin $e$.

F is the bell and F' is the striker, which comprises a long arm having a hammer at its free end, the other end being pivoted in any suitable way as at $F^2$. The shank of the hammer carries a projection $f'$ and the frame plate A carries a pin $f^2$, these two parts being connected by a spring $f^3$. I prefer to pass an adjusting screw $f^4$ through the pin $f^2$ and to attach one end of the spring $f^3$ thereto to adjust its strength. By this means the striker is normally in forward position and preferably just out of contact with the bell. A set screw $f^5$ binds the adjusting screw $f^4$ in place and a pin $f^6$ is preferably used to limit the movement of the striker. The striker arm carries a cam-piece $F^3$, the cam surface $f$ being shaped to engage each pin $e$ on the yoke E as the yoke rotates, this construction being such that in so doing each pin $e$ on striking the cam piece $F^3$ will throw the hammer back for a considerable distance so that it may get up a sufficient momentum on its return movement under the influence of the spring to give the bell a proper blow.

The mechanism so far described if operated under clock work would result in a continuous striking of the bell by the hammer. To prevent this continuous striking I employ the friction clutch above described. The gear C is not only in mesh with the gear D but also with the lower gear G mounted on the shaft $g$. This gear G as shown carries at its end outside of plate A, an arm G', at the end of which are two pins $g'$ $g^2$.

H is an electromagnet. Its armature $h$ is mounted on a swinging arm H' and is under control of a spring $h'$ and stop $h^2$ of usual character. The upper end of the arm H' has a pin $h^3$ projecting laterally from it, which is so located with relation to the pins $g'$ $g^2$ that when the electromagnet is not energized it will engage one of these pins and so prevent the arm G' from rotating. When the arm G' cannot rotate the gear G cannot rotate, and hence the gear C will slip on its shaft. When however the electromagnet H is energized and attracts the arm H' it releases the arm G' and so unlocks the gear G, thus allowing the gear C to be rotated by the friction clutch or clamp and power to be applied to the gear D and lever E to throw back the hammer and cause the bell to be struck on its return blow.

In connection with this mechanism I have shown a convenient form of mechanism for causing the electromagnet H to be energized automatically and so causing the operation of the bell hammer. Various forms of mechanism may be used for this purpose, but a convenient one comprises a clock mechanism, which, as it is old, need only be briefly described.

J is a spring mounted in a frame J' similar to the frame A A', $a$ $a'$ on a shaft J$^2$ which carries a pawl and ratchet J$^4$ and gearing connected with a train of gears lettered as a whole "J$^3$", operating a circuit closer K. This circuit closer is a wheel, the barrel of which is insulated as shown in Fig. 1, and the periphery of which is metallic, or made of conducting material, and provided with projections $k$.

K' and K$^2$ are spring fingers adapted to be engaged by the projections $k$, and mounted on an insulating plate K$^3$ supported on the frame J'. The screws which attach the fingers K' K$^2$ to the plate K$^3$ serve as binding screws, from one of which leads a wire $k'$ to the battery $k^2$, and from thence to the electromagnet H, the other binding screw being connected by a wire $k^3$ with the other terminal of the eelctromagnet H.

When it is desired to give the signal for which the circuit closer K is prepared by the number of projections $k$ on its periphery, a crank handle J$^5$ on the shaft J$^2$ is turned one or more times and then released. The turning of this handle winds up the spring J and upon its release the spring in its endeavor to expand sets the train of gears in operation and rotates the circuit closer K so that the projections $k$ in turn come in contact with the fingers K' K$^2$ and the circuit is closed momentarily between the fingers by means of the particular projection or rib $k$ with which they engage. A suitable flywheel or escapement (not shown) forms part of the clock mechanism in this instrument to control the rapidity with which the spring unwinds.

It will be evident to any electrician that a number of these automatic circuit closers may be wired in a circuit to include the battery $k^3$ and electromagnet H so that various signals may be given from various instruments, one to indicate the beginning of school; one the beginning of recess; one a "no school" signal, and one a fire signal, etc.; or another circuit closer having a different number of projections may be substituted for the one shown. Any form of key or hand-operated circuit closer may be used instead of an automatic mechanism. I have not shown these various circuits because their arrangement will be evident to one skilled in the art. Moreover, I do not mean to limit myself to the precise form of construction shown and described above for the mechanism by which the hammer is operated, as that may be varied and still come within the terms of my invention.

The form of friction clutch is convenient and efficient but other forms of clutch may be interposed between the constantly moving mechanism or motor and the mechanism by which the bell is struck.

What I claim as my invention is:

1. In a device of the kind described, the combination with a constantly running motor shaft, of a clutch one member of which is permanently connected to said shaft to be constantly operated thereby and the other or second member of which is loose on said shaft, a bell, a striker, comprising a hammer and pivoted arm by which said hammer is carried, connections between said clutch and said pivoted arm whereby the said hammer may be moved away from said bell, a returning spring to cause the said hammer to strike said bell when said arm is released, and means, operable from a distance, whereby said clutch members may be engaged with said connections for causing said hammer to sound said bell when desired.

2. In a device of the kind described, the combination with a constantly running motor shaft, of a clutch one member of which is permanently connected to said shaft to be constantly operated thereby and the other or second member of which is loose on said shaft, a bell, a striker, comprising a hammer and a pivoted arm by which said hammer is carried, connections between said clutch and said pivoted arm whereby the said hammer may be moved away from said bell, a returning spring to cause the said hammer to strike said bell when said arm is released, means to restrain said second clutch member from rotation, and means, operable from a distance, whereby said restraining means will be rendered inactive so as to release said second clutch member and thus permit said striker to sound said bell.

3. In a device of the kind described, the combination with a constantly running motor shaft, of a clutch one member of which is permanently connected to said shaft to be constantly operated thereby and the other or second member of which is loose on said shaft, a bell, a striker comprising a hammer and a pivoted arm by which said hammer is carried, connections between said clutch and said pivoted arm whereby the said hammer may be moved away from said bell, said connections comprising rotating pins and a cam piece or part on said pivoted arm to be engaged by and released from said pins, a returning spring to cause the said hammer to strike said bell when said arm is released, means to restrain said second clutch member from rotation, and means, operable from a distance, whereby said restraining means will be rendered inactive so as to release said second clutch member and thus permit said striker to sound said bell.

4. In a device of the kind described, a constantly-moving shaft a clutch member mounted thereon to rotate therewith, a gear loosely mounted on said shaft in frictional contact with said clutch member, a second clutch member loosely mounted on said shaft and also in contact with said gear, means for holding said gear stationary, and means for releasing said gear, in combination with a striker operated by said gear whereby upon the rotation of said gear said striker will be operated.

5. In a device of the kind described, in combination, a striker, a cam piece carried thereby, a rotatable member adapted to engage said cam piece and operate said striker, and means for operating said rotatable member comprising a constantly-rotating shaft, and a clutch, one member of which is operated constantly by said shaft and the other clutch member of which is connected to said rotatable member, and means for intermittently allowing the engagement of said clutch members.

6. In a device of the kind described, in combination, a motor shaft, a clamp one member of which is permanently connected to said shaft, the other member being free thereon, a gear also free on said shaft located between said clamp members and adapted to be rotated by contact with said first-named clamp member, a mechanism comprising an arm adapted to rotate with said second clamp member, means for holding said arm normally in fixed position, means for releasing said arm whereby it and said second clamp member and said gear will be allowed to rotate with said first clamp member, a striker, and means operable upon the rotation of said gear to operate said striker.

7. In a device of the kind described, in combination, a motor shaft, a clamp one member of which is permanently connected to said motor shaft, the other member being free thereon, a gear also free on said shaft located between said clamp members and adapted to be rotated by contact with said first-named clamp member, a mechanism comprising an arm adapted to rotate with said clamp member, means for holding said arm normally in fixed position, means for releasing said arm whereby it, said second clamp member and said gear will be allowed to rotate with said first clamp member, said means comprising an electro-magnet and connections including a battery and a circuit closer, a striker, and means operable by the rotation of said second clamp member whereby said striker will be operated.

8. In a device of the kind described, in combination, a motor shaft, a clamp one member of which is permanently connected to said motor shaft, the other member being free thereon, a gear also free on said shaft located between said clamp members and adapted to be rotated by contact with said first-named clamp member, means for holding said rotatable arm normally in fixed position comprising a swinging arm carrying an armature and means for releasing said rotary arm comprising an electro-magnet and connections including a battery and a circuit closer, a striker, means operable upon the release of said rotary arm and connecting said striker and said second clamp member whereby upon the energizing of said electro-magnet said striker will be operated.

FREDERICK WILLIAMS.

Witnesses:
 JAY F. COOK,
 A. M. FALLIS.

Copies of this patent may be obtained for five cents each, by addressing the "Commissioner of Patents, Washington, D. C."